UNITED STATES PATENT OFFICE.

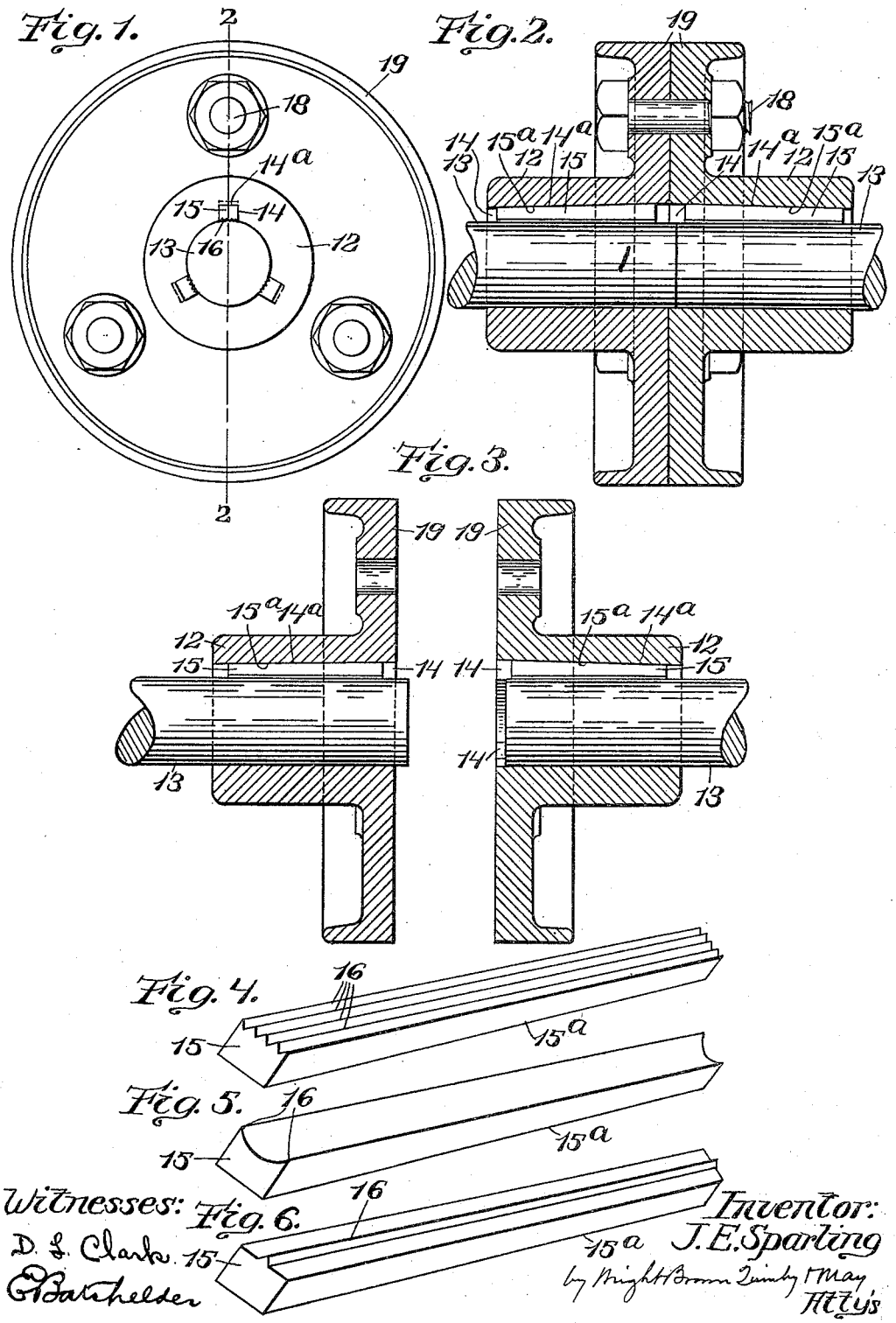

JOHN E. SPARLING, OF BOSTON, MASSACHUSETTS.

SHAFT-COUPLING.

1,163,276.    Specification of Letters Patent.    Patented Dec. 7, 1915.

Application filed May 21, 1913. Serial No. 769,077.

*To all whom it may concern:*

Be it known that I, JOHN E. SPARLING, a subject of the Dominion of Canada, of Boston, in the county of Suffolk and State of Massachusetts, have invented certain new and useful Improvements in Shaft-Couplings, of which the following is a specification.

This invention relates to a shaft coupling comprising a pair of hubs adapted to receive lengths or sections of shafting and having flanges adapted to be coupled together to hold the sections in alinement with each other.

The invention has for its object to provide improved means for locking the flanged hubs to the shaft sections in such manner as to permit the inner faces of the hub flanges to be abutted together, and it consists in the improvements which I will now proceed to describe and claim.

Of the accompanying drawings:—Figure 1 represents a side view of a coupling embodying my invention. Fig. 2 represents a section on line 2—2 of Fig. 1. Fig. 3 represents a view similar to Fig. 2 showing the members of the coupling and the shaft sections united thereto, the members being separated from each other. Figs. 4, 5 and 6 represent perspective views of the different forms of locking keys.

The same reference characters represent the same parts in all the figures.

In the drawings,—12, 12 represent cylindrical hubs each having a cylindrical bore adapted to receive and have a sliding fit on a shaft length or section 13. Each hub is provided with one or more longitudinal key ways 14 opening into the bore of the hub, three key ways being shown in the present embodiment of the invention. Each key way has a bottom 14ª which is inclined relatively to the axis of the hub as shown by Figs. 2 and 3. In each key way is inserted a key 15 preferably of hardened steel having an inclined back 15ª corresponding to the inclination of the bottom 14ª of the key way, the keys being independent of each other and inserted in the key ways with their backs in contact with the inclined bottoms of the key ways and being adapted to be driven longitudinally into the key ways from the inner ends of the hub. The inner face of each key way is formed to grip the periphery of a shaft section 13, the keys being so proportioned that when driven into the key ways they are forced inwardly and caused to project slightly into the bore of the hub by the inclination of the key way bottoms. The inner faces of the keys are preferably provided with longitudinal teeth 16 extending from end to end of the keys, the teeth being formed to slightly indent the periphery of the shaft section 13 and thus lock the hub and shaft section firmly together and prevent independent longitudinal and rotary movements of either part. Each key may have a single tooth 16 as shown by Fig. 6, two teeth as shown by Fig. 5, or more than two teeth as shown by Fig. 4.

In coupling together two sections of shafting, I first insert the sections 13 in the hubs, one section preferably having its inner end offset inwardly from the inner end of the hub, while the other section has its inner end correspondingly projected as shown by Fig. 3. The keys are then driven into the key ways until the hubs are firmly locked to the shaft sections. The inner ends of the hubs are then brought together and connected by bolts 18 passing through orifices in flanges 19 formed on the inner ends of the hubs, the end of the shaft section projecting from one of the hubs entering the bore of the other hub as indicated by Fig. 2. The joints formed by the meeting ends of the sections 13 are therefore out of alinement with the joints formed by the meeting ends of the hubs and their flanges, an arrangement which contributes to the strength of the coupling.

It will be seen that in driving the keys into the key ways the teeth 16 engage the shaft sections without having any tendency to force said sections endwise so that it is feasible to relatively arrange the shaft sections in the manner shown by Fig. 3 before locking them to the hubs.

In assembling the parts as shown by Fig. 3, I preferably cause the projecting end of one shaft section to project from the inner end of the hub in which it is inserted slightly farther than the backward offset of the end of the other shaft section from the inner end of the other hub, so that when the inner ends of the hubs are drawn together by screwing the nuts on the coupling bolts, the shafts are moved slightly endwise in the hubs after their ends meet and the keys are at the same time moved slightly lengthwise with the shafts and forced inwardly and caused to more firmly grasp or additionally lock the shaft sections.

The flanges 19 and bolts 18 constitute a means for forcing the hubs endwise toward each other, without rotary movement of either hub, so that after the shaft sections have been preliminarily locked to the hubs before the latter are coupled together as shown by Fig. 3, the shaft sections and keys may be moved endwise in the hubs by the operation of forcing the hubs toward each other, to additionally lock the sections to the hubs as above described.

The thicker ends of the independent keys are formed to enter the hubs so that they do not project from the planes of the inner faces of the flanges. Said inner faces are therefore adapted to be abutted together and have a firm bearing on each other, the hubs being therefore held rigidly in exact alinement.

What I claim and desire to secure by Letters Patent is:—

A shaft coupling comprising two shaft-receiving hubs having longitudinal key ways the bottoms of which are inclined relatively to the axes of the hubs so that said key ways and the periphery of shaft sections inserted in said hubs form tapering key-receiving spaces, the deeper ends of the key ways being at the inner ends of the hubs, two independent sets of locking keys tapered to conform to said spaces and adapted to preliminarily lock two shaft sections independently to the hubs with the inner end of one shaft section offset inwardly to form a recess, and the inner end of the other shaft section projecting outwardly to enter said recess, and means for forcing the hubs inwardly toward each other without rotary movement, to cause the ends of the shaft sections to abut together within one of the hubs and additionally lock the sections to the hubs, said means including flanges on the hubs, and bolts connecting the flanges, the independent keys being formed to permit the opposed faces of the flanges to abut closely together.

In testimony whereof I have affixed my signature, in presence of two witnesses.

JOHN E. SPARLING.

Witnesses:
GORDON G. GUILLET,
JOHN ZIMMERMAN.

Copies of this patent may be obtained for five cents each, by addressing the "Commissioner of Patents, Washington, D. C."